(12) United States Patent
Choi

(10) Patent No.: US 7,623,288 B2
(45) Date of Patent: Nov. 24, 2009

(54) HIGH DEFINITION THIN FILM REFLECTIVE SCREEN

(76) Inventor: Hae-Yong Choi, Mookdong I Park Apartment #108-301, 385 Mook-dong, Jungryang-gu, Seoul (KR) 131-768

( * ) Notice: Subject to any disclaimer, the term of this patent is extended or adjusted under 35 U.S.C. 154(b) by 486 days.

(21) Appl. No.: 11/391,272

(22) Filed: Mar. 29, 2006

(65) Prior Publication Data

US 2007/0153376 A1 Jul. 5, 2007

(30) Foreign Application Priority Data

Jan. 5, 2006 (KR) ............... 10-2006-0002128

(51) Int. Cl.
*G03B 21/60* (2006.01)
(52) U.S. Cl. .................................. 359/359
(58) Field of Classification Search ............. 359/443, 359/459
See application file for complete search history.

(56) References Cited

U.S. PATENT DOCUMENTS

| | | | | |
|---|---|---|---|---|
| 5,361,163 | A * | 11/1994 | Matsuda et al. ........... | 359/452 |
| 6,144,491 | A * | 11/2000 | Orikasa et al. ............ | 359/452 |
| 6,288,172 | B1 * | 9/2001 | Goetz et al. .............. | 525/200 |
| 6,530,664 | B2 * | 3/2003 | Vanderwerf et al. ...... | 353/74 |
| 6,853,486 | B2 * | 2/2005 | Cruz-Uribe et al. ...... | 359/443 |
| 7,221,508 | B2 * | 5/2007 | Maruta et al. ............ | 359/459 |
| 2004/0100691 | A1 * | 5/2004 | Sinkoff .................... | 359/449 |
| 2004/0196562 | A1 * | 10/2004 | Watanabe et al. ........ | 359/626 |
| 2004/0240054 | A1 * | 12/2004 | Aiura et al. .............. | 359/455 |
| 2005/0248843 | A1 * | 11/2005 | Maruta et al. ............ | 359/459 |
| 2005/0280893 | A1 * | 12/2005 | Baba et al. ............... | 359/457 |
| 2005/0280898 | A1 * | 12/2005 | Oshima et al. ........... | 359/614 |

FOREIGN PATENT DOCUMENTS

| | | |
|---|---|---|
| GB | 2118210 | 10/1983 |
| WO | WO 94/22049 | 9/1994 |
| WO | WO 2004/051364 | 6/2004 |

* cited by examiner

*Primary Examiner*—Christopher E Mahoney
*Assistant Examiner*—Leon W Rhodes
(74) *Attorney, Agent, or Firm*—Bacon & Thomas, PLLC

(57) ABSTRACT

A thin film reflective screen includes a surface layer, a transmission layer, a diffusion layer and reflection layers, which are formed in a single screen, which has functions such as an image forming on a surface, scattering, transmission, diffusion, and reflection, which are duplicated by re-reflecting light such that an image signal of pixel unit of an electronic image projected from a DLP projector or an LCD projector is enlarged to increase definition and brightness of the image. A dark color layer is formed on the surface of the screen such that contrast of the image is increased during the diffusion and the reflection, and as a result, resolution of the image is increased by two to nine times.

9 Claims, 8 Drawing Sheets

HIGH DEFINITION THIN FILM REFLECTIVE SCREEN

BACKGROUND OF THE INVENTION

1. Field of the Invention

The present invention relates to a screen to which a projector projects an image chiefly generated according to an electronic signal such as a liquid crystal display (LCD), a digital light processor (DLP), liquid crystal on silicon (L-COS), or the like, in particularly, to a thin film reflective screen for simultaneously performing transmission, diffusion, and reflection of an image within a single screen and having a structure of re-reflecting the image such that definition and contrast can be increased more than two times by every pixel.

2. Description of the Related Art

A conventional image formed by a conventional projector, as shown in FIG. 1, for example, a high definition (HD) image is formed on an imaging plate 100 consisting of 1980 horizontal (W) pixels*1080 vertical (H) pixels, a lamp illuminates the rear side or the front side of the screen such that a light emitted from the lamp is transmitted directly or is reflected onto and through the imaging plate 100 to be projected through a projector lens to the screen. This is already well known to those skilled in the art.

However, the image of the projector, that is, as shown in FIGS. 1, 2a, 2b, and 3, the structure of pixels of the imaging plate 100, has problems as follows. For example, as shown in FIG. 2a, in a digital light processor (DLP) imaging plate 100, due to boundaries formed by areas of pixel unit image signals 9 and pixel unit reflective mirrors, which are formed by microchips of a small sized chip, that is, due to areas of pixels 8, an image difference occurs. In a liquid crystal display (LCD) projector, as shown in FIG. 2b, switches for transmitting and interrupting image lights of the image signals from an LCD to every unit pixel 8 must be provided around the respective pixels 8. However, since light cannot be transmitted through the switches, there is a brightness difference, that is, the brightness of the image signal 9 of a central unit pixel is two times entire brightness of the unit pixels 8.

The structure of a light source for projecting light to the imaging plate 100 is depicted in FIG. 2c. As shown in the drawing, since the brightness of a main light source R1 disposed at the central region of the light source, as an illuminative object is more than two times the brightness of a sub-light source R2 around the main light source R1, the resolution of the unit pixels 8 is not uniform.

Thus, as shown in FIG. 3, since there is non-uniformity between a dark area around the unit pixels 8 of the imaging plate 100 and the central area of the unit pixels 8 of the light source of the unit pixel image signals 9 and the non-uniformity is enlarged and projected on whole screen, due to the non-uniformity, an image formed on the screen is rough, the resolution of the image on the screen is deteriorated, the brightness of the image is lowered so that definition of the image is also deteriorated, there occurs noise in the image, and contrast of the image is also deteriorated.

SUMMARY OF THE INVENTION

Therefore, the present invention has been made in view of the above and/or other problems, and it is an object of the present invention to provide a high definition thin film reflective screen in which a difference between whole brightness range of unit pixels of an imaging plate of a projector and an image signal as brightness range of a unit pixel image signal is compensated during transmission, diffusion, and reflection of light in a screen to increase definition of the image and contrast is increased during the transmission and the reflection of the light through the screen whereby resolution and definition of the image on the screen are enhanced.

BRIEF DESCRIPTION OF THE DRAWINGS

These and/or other aspects and advantages of the present invention will be come apparent and more readily appreciated from the following description of the embodiments, taken in conjunction with the accompanying drawings, in which.

DESCRIPTION OF THE PREFERRED EMBODIMENTS

Figure 5:
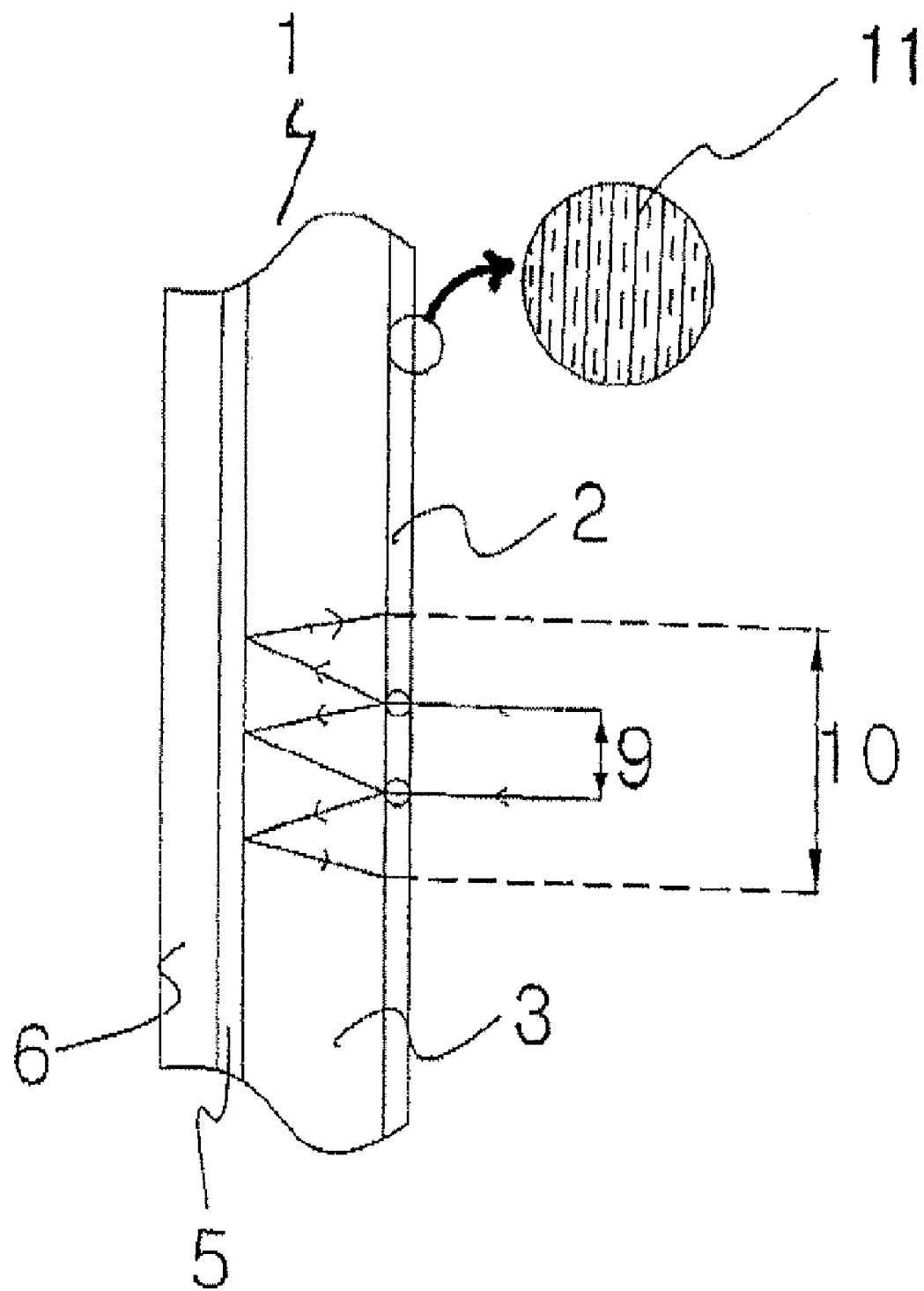
FIG. 5 is a sectional view illustrating the structure of the screen according to the preferred embodiment of the present invention.

As shown in FIG. 5, a thin film reflective screen 1 according to a preferred embodiment of the present invention includes a single thin film structure, and includes a surface layer 2 on which an image projected from a projector is formed, a transmission layer 3 through which some of an image light from the surface layer 2 transmits, and on which diffusion material for diffusing the light transmitted through the transmission layer 3 is distributed, and reflection layers 5,6 formed in the rear side of the transmission layer 3 to re-reflect the light transmitted through the transmission layer 3.

The thin film reflective screen 1 is made of transparent materials capable of being made into a thin film such as polyethylene, polyester, or the like. In order to reinforce the rigidity of the thin film reflective screen 1, some material such as plastic, metal, or the like may be added to the rear side of the thin film reflective screen 1.

However, in order to provide a re-reflective function to the thin film reflective screen 1, since when the transmission layer 3 is thick there may be a duplicated image according to circumstance, the thickness of the thin film reflective screen 1 is preferably more than 2 μm but less than 5 mm according to the size of the thin film reflective screen 1, and the material at the rear side thereof is not limited in accordance with its uses.

The transmission layer 3 has a structure that embossing (11) is processed onto the surface layer 2 of the thin film reflective screen 1 such that incident light is transmitted through the transmission layer 3. In this case, the transmission layer 3 is transparent so that the transmission ratio of the light is increased.

The surface layer (2) of the screen (1) is formed with transparent materials and the surface layer (2) has an embossed side with particles of 50#- 500#.

When a fineness number of the surface is #(mesh)50 to #(mesh)500 after processing the embossing (11), transmission effect of about 20% to 70% and reflection effect of about 80% to 30% can be obtained from the surface layer 2.

The fineness number of the surface capable of obtaining the transmission effect of 50% and the reflection effect of 50% is preferably #100 to #300. However, since the fineness number of the surface may be changed according to the selected material added to the thin film reflective screen 1, the fineness number of the surface is selected according to a refractive index of the material of the thin film reflective screen 1.

Moreover, even when the diffusion material is coated on the transmission layer 3 with a predetermined thickness, the transmission layer 3 is produced to be transparent.

The diffusion material is distributed into the transmission layer 3 of the thin film reflective screen 1 so that the image light transmitted through the transmission layer 3 can be diffused.

The above diffusion material is made in the form of a spherical fine grain by using transparent material such as silica for transmitting light and the grain size is preferably less than 70 μm.

The reason is because the diffusion effect can be obtained without loss of light when the refractive index of the diffusion material is greater than the refractive index of the material of the thin film reflective screen 1 and the fine grains less than 70 μm have a refractive index more than twice the refractive index of usual medium so that a diffusion effect can be increased two times or more.

The reflection layers 5, 6 are made of metal or plastic a white silver colored or black colored polished surface with a high surface reflectance.

In order to remove a residual image, a fast response speed of the reflection layers 5, 6 is required. For the fast response speed, a high transmittance of light reaching the reflection layers 5, 6 is required.

Since the thin film reflective screen according to the preferred embodiment of the present invention has a structure for re-reflecting the light even when reducing the scattering and the refractive index and increasing the transmittance by twice as described above, the same diffusion effect can be achieved so that a reflective responsive speed can be increased as much as possible. Moreover, the residual image is reduced by a half so that the definition of the image is increased more than twice.

As described above, in the thin film reflective screen according to the preferred embodiment of the present invention, some of the light is scattered in the surface layer 2 of the thin film reflective screen 1, and the rest is diffused by the diffusion material while being transmitted through the transmission layer 3, is re-reflected by the reflection surface 6, is transmitted through the transmission layer 3 again, and is combined with the image formed on the surface layer 2.

Thus, in the thin film reflective screen 1 according to the preferred embodiment of the present invention, since the diffusion effect caused by the refraction is more than twice that of the re-reflection, the quantity of the refractive material and the diffusion material can be reduced by a half and the transmittance of the light can be increased so that the brightness of the image can be also increased.

The grains embossed into the surface of the transmission layer 2 have a fineness number of #800 therefore having a high transmittance so that the refractive index required for the diffusion is reduced and the transmittance of light is increased to increase the brightness of the image two times.

Thus, according to the thin film reflective screen 1 of the present invention, the light of unit pixel image signal 9 smaller than the area of the unit pixel 8 of the imaging plate 100 of the projector remains in the surface layer 2 of the thin film reflective screen 1 as shown in FIG. 5, and the rest of the light is transmitted through the transmission layer 3 and is diffused and re-reflected by the reflection layers 5, 6 then is diffused twice at the transmission layer 3 and is combined with the image of the surface layer 2.

Figure 1:
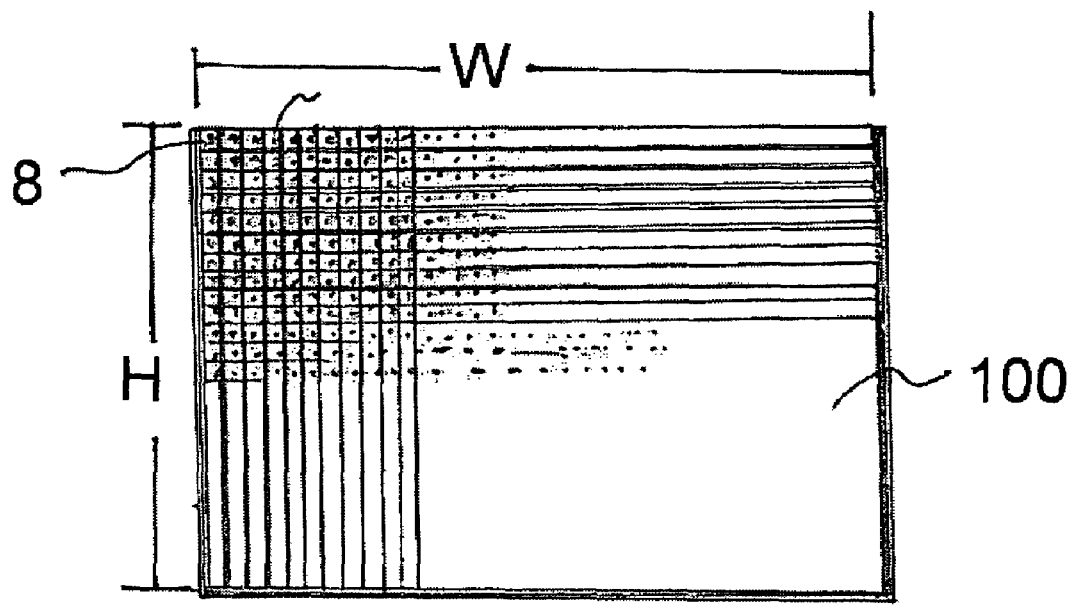
FIG. 1 is a view illustrating a structure of a screen formed by a conventional electronic projector.
Figure 2A:
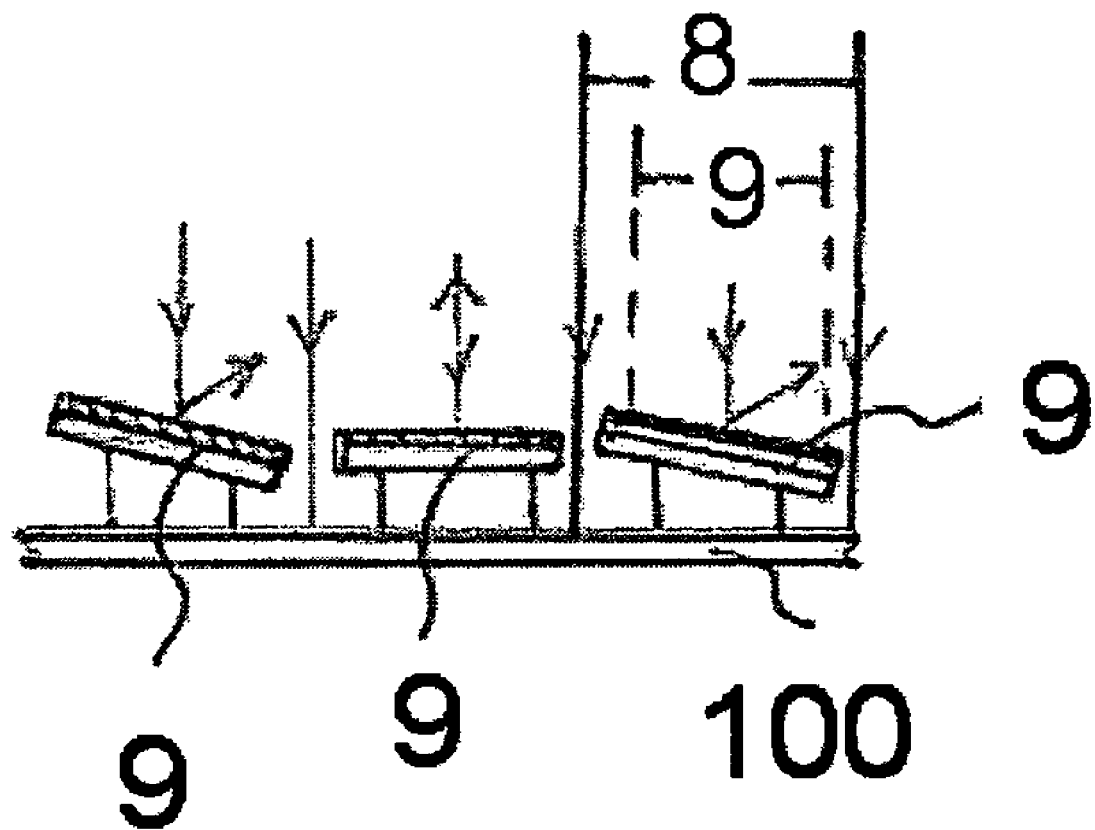
FIG. 2a is a view illustrating a structure of a digital light processing type imaging plate of the conventional electronic projector.
Figure 2B:
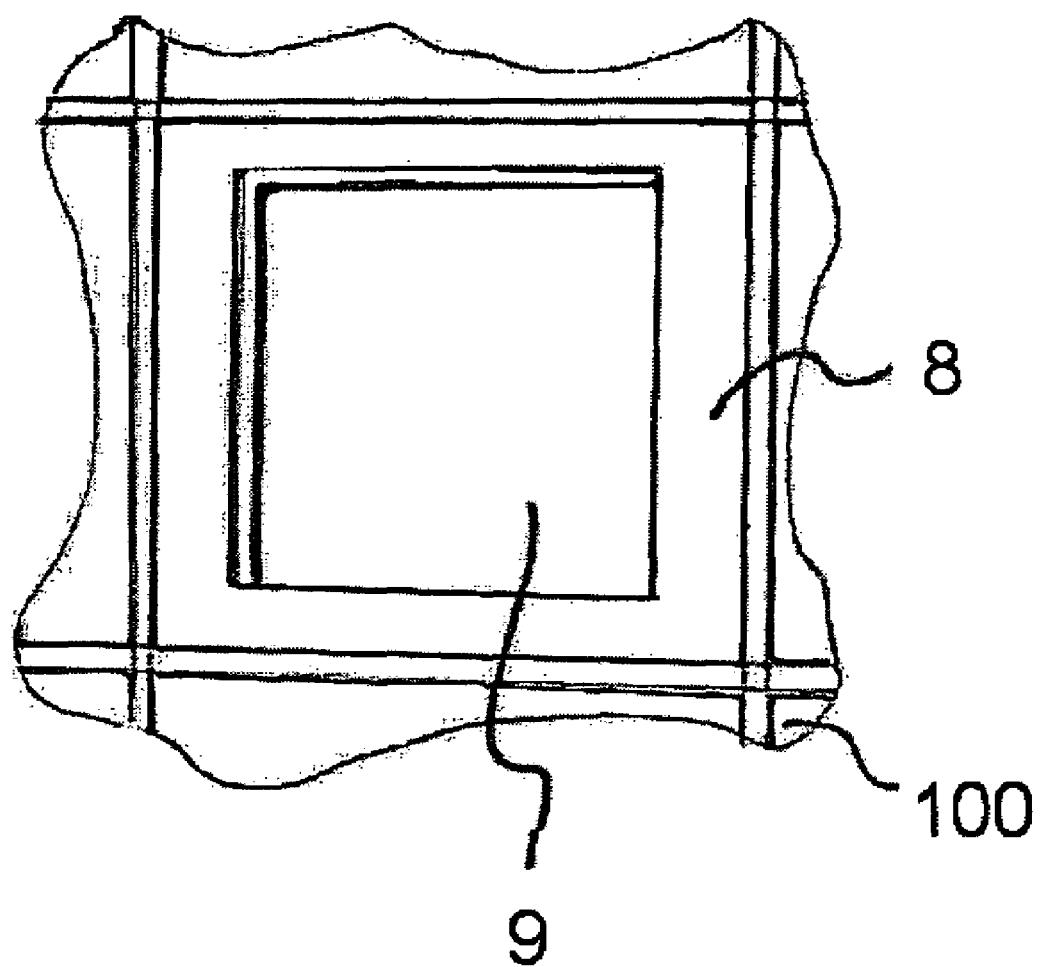
FIG. 2b is a view illustrating a structure of an imaging plate of a liquid crystal display type of the conventional electronic projector.
Figure 2C:
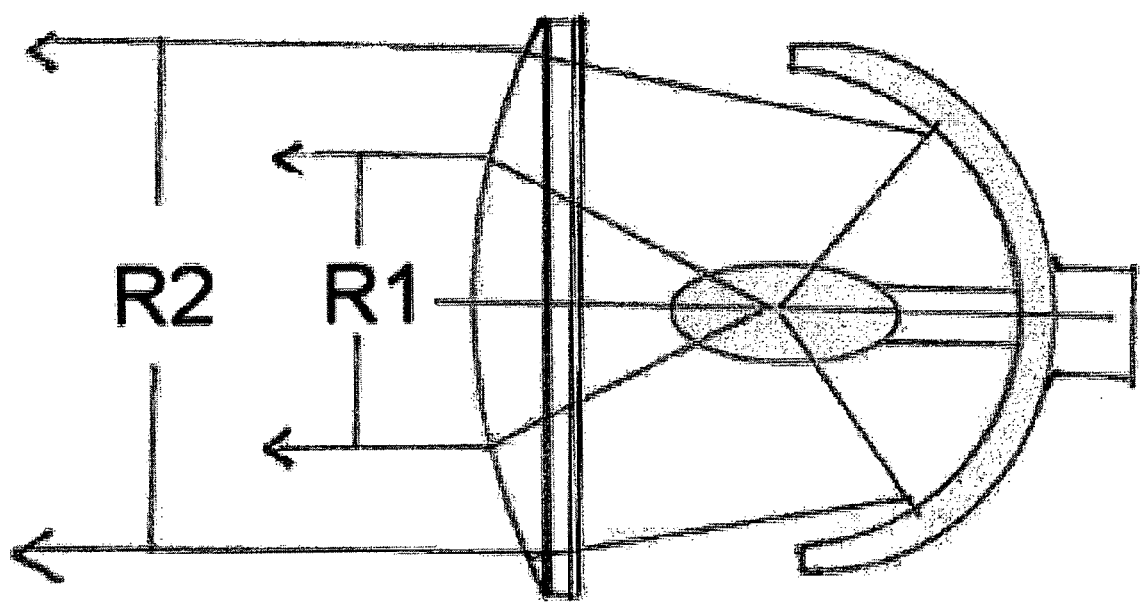
FIG. 2c is a view illustrating a lamp used in the conventional electronic projector.
Figure 3:
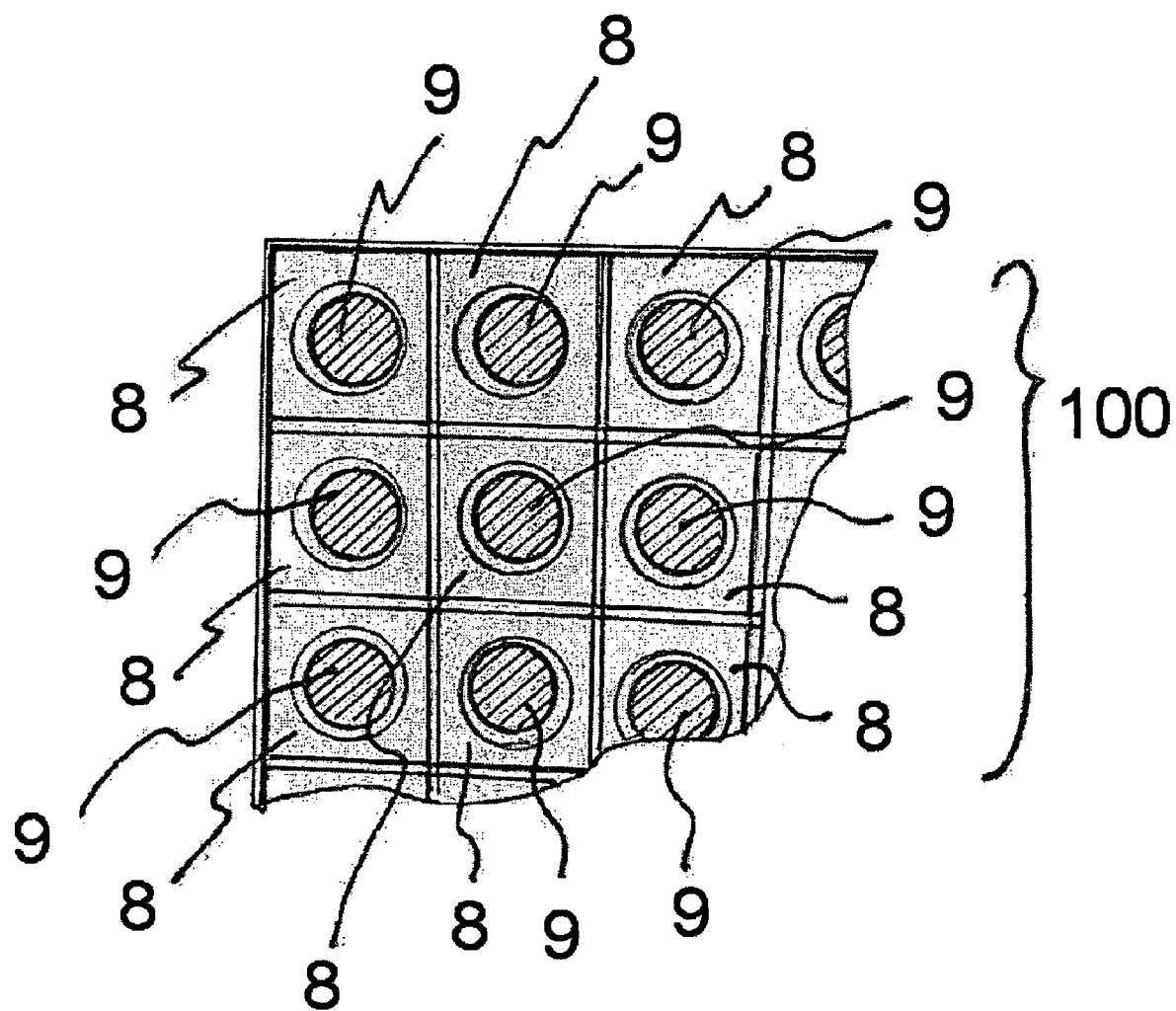
FIG. 3 is a view illustrating the structure of pixels of the screen in FIG. 1.
Figure 4:
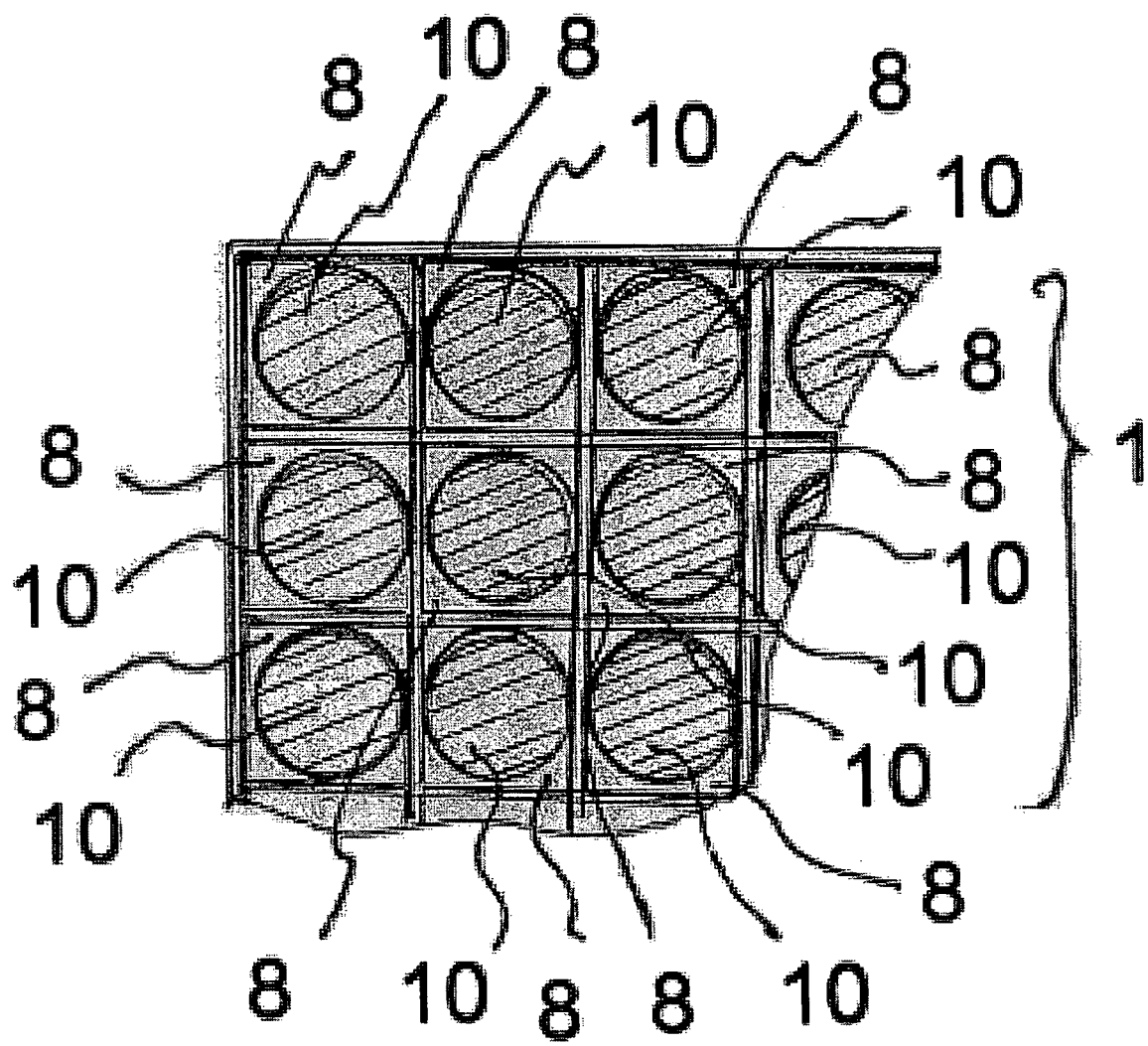
FIG. 4 is a view illustrating pixels of a screen according to a preferred embodiment of the present invention.

Thus, in the thin film reflective screen 1 according to the preferred embodiment of the present invention, since the image, which is the signal of the unit pixel image 9 of the imaging plate 100 as shown in FIG. 3, is enlarged more than twice in the unit pixel 8 like the screen image signal 10 as shown in FIG. 4, the resolution, the definition, and the brightness of the image are increased twice.

Figure 6:
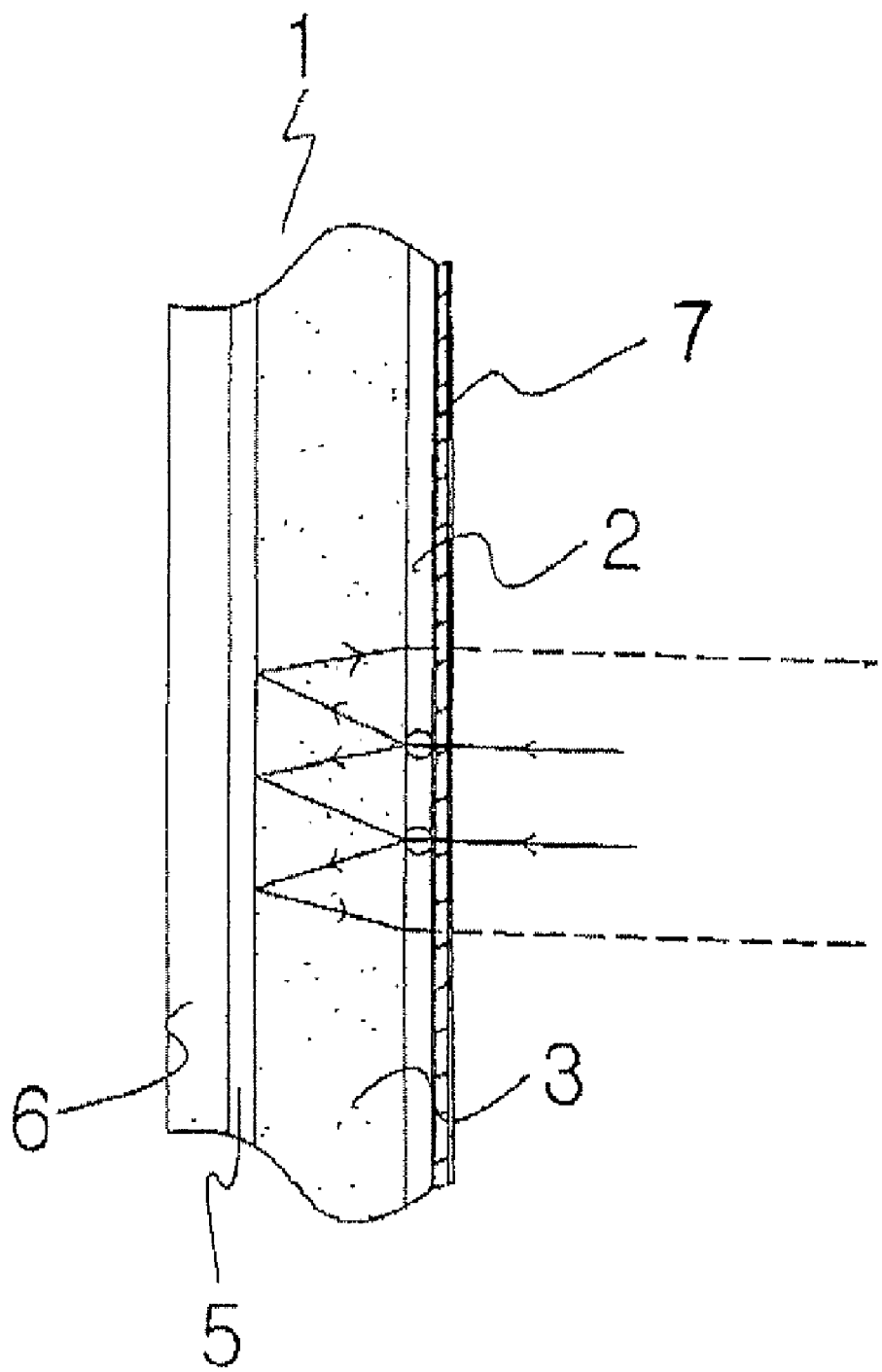
FIG. 6 is a sectional view illustrating operation and effect of the screen according to the preferred embodiment of the present invention.

The thin film reflective screen 1 according to the preferred embodiment of the present invention, as shown in FIG. 6, includes a dark color layer 7 formed by coating the surface layer 2 as the surface of the transmission layer 3 of the thin film reflective screen 1 with a dark color dye.

The dark color means color of a low brightness such as black, blue, or the like, and the dye means a transparent dye for transmitting light.

The dark color layer 7 is formed in the form of a thin film, and transmits white light and partially transmits the dark color light in proportion to shade of the dark color so that the contrast is increased.

For example, when a dark color layer 7 of nine times usual shade of the dark color is formed, in a case of an image of white light 100: dark color light 1, that is, the contrast 100:1, since the thin film reflective screen 1 is a thin film, the white light transmits as it is and the dark color light is darkened by nine times 1*9=9 when the dark color light is transmitted through the dark color layer, the brightness of the dark color light transmitted through the thin film reflective screen 1 becomes 1/9, that is, 0.11 of the initial dark color light. Thus, the contrast ratio is 100:0.11=about 900:1, that is, it is increased more than nine times the initial contrast ratio.

Thus, the definition of the image is increased more than nine times.

When the shade of the dark color is 30%, an image with a contrast ration of 100:1 is calculated as described above, the ratio of white light:dark color light is 100*70%:1*30%=70:0.3=233:1. Thus, the contrast ratio is increased more than 2.33 times.

However, since the thin film reflective screen according to the preferred embodiment of the present invention, as described above, has a structure for allowing the light to be transmitted through the transmission layer 3 and to be reflected by the reflection layers 5, 6 the contrast ratio is twice at the same shade of the dark color.

A preferable ratio of the image light formed on whole surface layer 2 of the thin film reflective screen 1 and the transmittance light is 30%:70%.

In this case, since the transmittance light of 70% is diffused and reflected by the transmission layer 3 and is enlarged to the size of the unit pixel 10 of the screen with doubled area, the light of 70% is reduced by a half and is reflected as a light with a brightness of 35%, then is combined with a light of 30% on the surface layer.

Thus, the thin film reflective screen according to the preferred embodiment of the present invention increase the brightness and resolution of the image more than two times and the contrast ratio by two to nine times so that the definition of the image is more than four times greater.

Moreover, the thin film reflective screen 1 according to the preferred embodiment of the present invention, as shown in FIG. 5, can be utilized as a roll screen by attaching a reinforcing film to the rear side of the thin film reflective screen 1, and can be utilized as a plate screen when a plastic plate is attached to the rear side of the thin film reflective screen 1.

As described above, according to the thin film reflective screen of the present invention, a single screen 1 is formed by the surface layer 2 on which the image is formed, the transmission layer 3, and the reflection layers 5, 6, and the scattering, the transmission, the diffusion, and the reflection, caused by forming an image on the surface of the thin film reflective screen of the present invention from an electronic image projected from the DLP projector or the LCD projector, occur in the single screen. Moreover, the image is re-reflected by the thin film structured reflection layers 5, 6 to repeat the above process so that the re-reflected image is combined in the surface layer 2 of the thin film reflective screen 1, and the signal of the unit pixel image 10 is enlarged to the size of the unit pixel 8 so that the definition and the resolution of the image are doubled, the brightness of the image is increased more than two times, and the contrast ratio is increased by two to nine times.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high definition thin film reflective screen comprising:
   a surface layer on which an image is formed;
   a diffusion layer and a transmission layer formed as one layer at the rear side of the surface layer; and
   reflection layers formed at the rear side of the diffusion layer; wherein
   transmittance, diffusion, and reflection of light which is incident upon the screen from a projector occur such that the area of a unit pixel which is produced upon the screen is doubled.

2. The high definition thin film reflective screen as set forth in claim 1, further comprising a diffusion material, through and by which the light is transmitted and is refracted, which is added to the transmission layer.

3. The high definition thin film reflective screen as set forth in claim 2, further comprising diffusion material coated on the surface of the transmission layer.

4. The high definition thin film reflective screen as set forth in claim 2, wherein the diffusion material is made in the form of a spherical fine grain with a grain size less than 70 μm.

5. The high definition thin film reflective screen as set forth in claim 1, further comprising an embossed surface on the surface layer.

6. The high definition thin film reflective screen as set forth in claim 1, wherein the thickness of the thin film reflective screen is more than 2 μm but less than 5 mm.

7. A high definition thin film reflective screen comprising:
   a dark color layer;
   a surface layer defined at the rear side of the dark color layer to form an image;
   a diffusion layer and a transmission layer formed as one layer at the rear side of the surface layer; and
   reflection layers formed at the rear side of the diffusion layer; wherein
   transmittance, diffusion, and reflection of light which is incident upon the screen from a projector occur such that the area of a unit pixel which is produced upon the screen is doubled.

8. The high definition thin film reflective screen as set forth in claim 7, wherein the thickness of the thin film reflective screen is more than 2 μm but less than 5 mm.

9. A high definition thin film reflective screen comprising:
   a surface layer on which an image is formed;
   a transmission layer through which light is transmitted and diffused; and
   a reflection layer through which light is diffused and re-reflected; wherein image light that is transmitted and diffused by the transmission layer is subsequently reflected and diffused by the reflecting layers so that the light is caused to be diffused and transmitted through the transmission layer again and combined with the image formed on the surface layer such that the signal of a unit pixel is enlarged more than twice.

* * * * *

UNITED STATES PATENT AND TRADEMARK OFFICE
CERTIFICATE OF CORRECTION

PATENT NO. : 7,623,288 B2
APPLICATION NO. : 11/391272
DATED : November 24, 2009
INVENTOR(S) : Hae-Yong Choi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Fourteenth Day of December, 2010

David J. Kappos
*Director of the United States Patent and Trademark Office*